United States Patent
Iizuka et al.

(10) Patent No.: US 6,888,609 B2
(45) Date of Patent: May 3, 2005

(54) LIQUID CRYSTAL DISPLAY DEVICE

(75) Inventors: Tetsuya Iizuka, Saitama-ken (JP);
Nobuko Fukuoka, Saitama-ken (JP);
Yasuyuki Hanazawa, Saitama-ken (JP);
Seiichi Sato, Saitama-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 58 days.

(21) Appl. No.: 10/449,193

(22) Filed: Jun. 2, 2003

(65) Prior Publication Data

US 2004/0012751 A1 Jan. 22, 2004

(30) Foreign Application Priority Data

Jun. 17, 2002 (JP) ........................................ 2002-175950

(51) Int. Cl.⁷ ...................... G20F 1/1333; G02F 1/1335; G02F 1/1339
(52) U.S. Cl. ........................ 349/156; 349/86; 349/110; 349/155
(58) Field of Search ................................. 349/156, 113, 349/86, 110, 155

(56) References Cited

U.S. PATENT DOCUMENTS 5,978,061 A * 11/1999 Miyazaki et al. ........... 349/155
6,331,881 B1 * 12/2001 Hatano et al. ................ 349/86
6,784,956 B2 * 8/2004 Matsumoto et al. ........ 349/110

* cited by examiner

Primary Examiner—Huyen Ngo
(74) Attorney, Agent, or Firm—Oblon, Spivak, McClelland, Maier & Neustadt, P.C.

(57) ABSTRACT

A liquid crystal display device includes a thin film transistor (TFT) array substrate 10, a counter substrate 22 provided opposite to the TFT array substrate 10 and a liquid crystal layer 28 held between the TFT array and counter substrates 10 and 22. The TFT array substrate 10 has display and frame areas 31 and 32. There are pixel electrodes in the display area 31 which each have reflective and transparent portions 33 and 34 with convex and concave portions 29 and 30, respectively. Convex and concave portions 36 and 37 are also provided in the frame area 32 which are substantially the same in shape as convex and concave portions 29 and 30 in the display area 31. The surface of a photoresist coating film in the display area 31 shown by a dotted line 39 is substantially the same in configuration as that in the frame area 32 to make the column-like spacers 27 and 38 substantially the same in height. A cell gap between the TFT array and counter substrates 10 and 22 is made thereby substantially uniform.

5 Claims, 5 Drawing Sheets

LIQUID CRYSTAL DISPLAY DEVICE

FIELD OF THE INVENTION

This invention generally relates to a liquid crystal display device with both optically reflective and transparent electrodes per pixel and, more particularly, to a substrate structure suitable for a liquid crystal display device.

BACKGROUND OF THE INVENTION

A half transparent or hybrid type liquid crystal display (LCD) device has recently come into wide use. Such a half transparent type LCD device includes both optically reflective and transparent electrodes per pixel which are supposedly suitable for outdoor use. The reflective electrodes reflect ambient incident light as a light source for display while the transparent electrodes are prepared to make use of light from a rear light source for such a half transparent type LCD device.

FIGS. 5 and 6 are a schematic layout in a sectional view of a half transparent type LCD device and its schematically sectional view cut along the line VI—VI in the LCD device shown in FIG. 5, respectively. Major components of the LCD cell will be explained below with reference to FIGS. 5 and 6, and the other components understood by those skilled in the art are omitted for the sake of simplicity.

An LCD cell includes a thin film transistor (TFT) array substrate 10, a counter substrate 22 and a liquid crystal (LC) layer 28. The counter substrate 22 is provided opposite to the TFT array substrate 10. The LC layer 28 is held between the TFT array and counter substrates 10 and 22. The TFT array substrate 10 is formed on a transparent glass substrate 11 and is divided into display and non-display (or frame) areas 31 and 32. The display area 31 includes signal lines 12, an interlayer insulation film 13 and scanning lines 14 (not shown in FIG. 6). The signal lines 12 cross the scanning lines 14 with the interlayer insulation film 13 located between them. The signal and scanning lines 12 and 14 are disposed in a matrix form. Such a matrix has elements where pixels are provided with pixel TFTs and electrodes 15 and 16. Auxiliary capacitor lines 17 are provided in parallel with the scanning lines 14.

Each pixel electrode 16 has transparent and reflective portions 33 and 34 in its central and peripheral portions, respectively. The transparent portion 33 of the pixel electrode 16 used as a transparent electrode 18 is made of an indium-tin-oxide (ITO) film. The reflective portion 34, however, is covered with a metal film used for a reflective electrode 19. Since there are many signal and scanning lines 12 and 14 in the peripheral portion, it is advantageous to provide the central portion with the transparent electrode 18 in terms of light utilization efficiency. The reflective electrode 19 has an uneven surface to widen viewing angles for reflecting light. On the outer surface of the TFT array substrate 10 a polarizer 20 and a rear light source 21 are disposed in that order. The inner surface of the TFT array substrate 10 is covered with an alignment film, not shown.

The counter substrate 22, on the other hand, also includes a transparent glass substrate 23 on which a counter electrode 24, a color filter 25, etc. are formed in that order. The inner surface of the counter substrate 22 is covered with an alignment film, not shown, either. A polarizer 26 is put on the outer surface of the counter substrate 22.

The TFT array and counter substrates 10 and 22 are opposite to each other at a predetermined distance by column like spacers 27 and are fixed together by a sealant provided at their peripheral portions. A liquid crystal material which becomes the LC layer 28 is injected between the TFT array and counter substrates 10 and 22.

Meanwhile, the transparent and reflective portions 33 and 34 of the half transparent type LCD device have different light transmission paths through the LC layer 28. Light L1 from the rear light source 21 passes through the LC layer 28 once with respect to the transparent portion 33. Ambient light incident on the counter substrate 22 passes through the LC layer 28, is reflected from the reflective electrode 19, passes through the LC layer 28 again and is derived from it as reflected light L2. In short, the optical path for the reflected light L2 to pass through the LC layer 28 is much longer than that for the light L1 to do so. In order for both reflective and transparent displays to obtain an optimal optical property, optimum cell gaps should be designed for the transparent and reflective portions 33 and 34, respectively. Thus, as shown in FIG. 6, a convex portion 29 made of a resin film is provided under the reflective electrode 19 and a concave portion 30 is also made at the transparent electrode 18. As a result, the cell gap at the reflective portion 34 is made smaller than that at the transparent portion 33 so that the optical path for the ambient light to pass through the LC layer 28 can be adjusted. An LCD device of this sort is generally called a half transparent type LCD device with multiple gaps.

Column-like spacers 27 provided on the TFT array substrate 10 have been becoming the mainstream to maintain the cell gap because they are a much easier way of controlling the cell gap than ball spacers and cause uniform display quality without any substantial light leakage. In addition, such column-like spacers 27 are disposed not only on the display area 31 but also on the frame area 32 to maintain the cell gap for an entire panel of the LCD device.

Where the column-like spacers 27 are provided on the TFT array substrate 10, it is necessary to form them on the resin insulation layer because their firm fixation and density must be secured. The column-like spacers 27 are ordinarily formed on auxiliary capacitor lines 17 in the display area 31 as shown in FIG. 5 to avoid affecting pixel aperture rates. Thus, entirely convex portions are provided on the auxiliary capacitor lines 17 and the column-like spacers 27 are formed on the convex portions. Similarly, a resin layer used as a base member is formed in the frame area 32 and column-like spacers 38 are formed on the resin layer to maintain a uniform gap.

The column-like spacers 27 made of a resin material are formed by the steps of coating a photoresist film, exposure, development and removal. In the step of coating a photoresist film, unevenness on a surface of the film produces a great influence on the thickness of the coated film. It is called a "leveling" phenomenon when concave portions in the unevenness of the coated film make their film thickness thinner than flat portions. The frame area 32 is generally flat but the transparent and reflective portions 33 and 34 in the display area 31 cause the unevenness or such a "leveling" phenomenon. Thus the thickness of a coated photoresist film in the display area 31 is thinner than that in the frame area 32, so that the height of column-like spacers in the former are different from that in the latter. In other words, the cell gap in the display area 31 is not necessarily constant or uniform, so that it leads unsatisfactory display quality for the LCD display.

SUMMARY OF THE INVENTION

An object of the present invention to provide an LCD device with good display quality.

Another object of the present invention is to provide an LCD device with a substantially uniform cell gap.

According to one aspect of the present invention, a liquid crystal display device includes a thin film transistor (TFT) array substrate having display and frame areas, pixel electrodes including reflective and transparent portions formed on the display area of the substrate, the reflective and transparent portions being convex and concave in shape, respectively, scanning lines to transmit scanning signals, signal lines divided into at least first and second groups to transmit data signals, a second substrate provided opposite to the first substrate, a counter electrode formed on the second substrate, column-like spacers to maintain a gap between the first and second substrate, a liquid crystal layer held between the first and second substrate; and convex and concave portions formed on the frame area.

The liquid crystal display device is characterized in that the convex and concave portions formed on the frame area are substantially the same in shape as the reflective and transparent portions formed on the display area.

The liquid crystal display device is further characterized in that apertures defined in the concave portions formed on the frame area are bigger in size than those defined in the transparent electrodes formed on the display area.

The liquid crystal display device is also characterized in that the column-like spacers are provided on the convex portions formed on the frame area and the reflective electrodes formed on the display area.

The liquid crystal display device further includes projections formed on the concave portions formed on the frame area.

The liquid crystal display device is yet further characterized in that the column-like spacers are made on the first substrate by steps of coating a photoresist film, exposure, development and removal.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED EXPLANATION OF THE PREFERRED EMBODIMENTS

Figure 6:
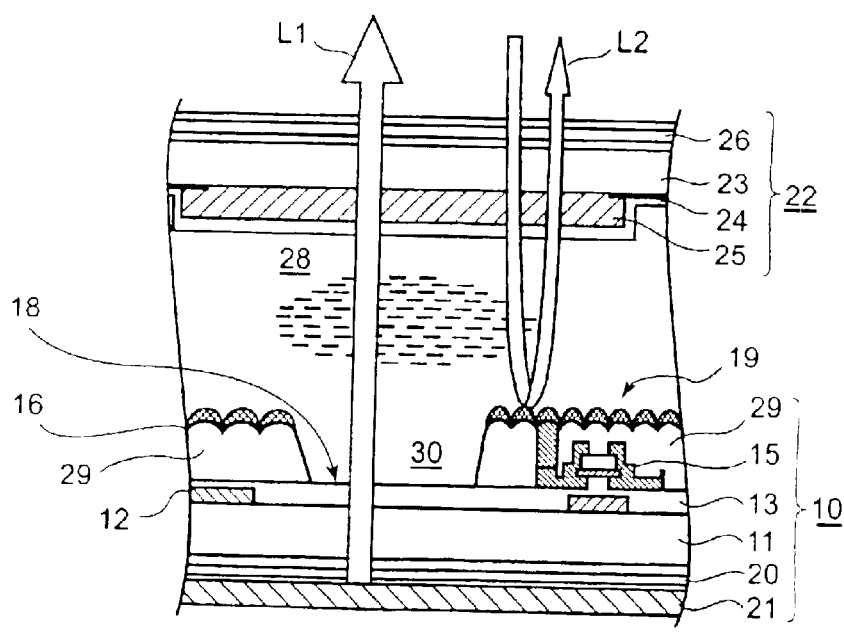
FIG. 6 is a schematically sectional view cut along the line VI—VI of the LCD device shown in FIG. 5.

Embodiments of the present invention will be explained below with reference to the attached drawings. It should be noted that the structure of an LCD device to which the present invention is applicable is basically the same as that of a prior art LCD device shown in FIG. 6. For the sake of simplicity, some components of such an LCD device are not necessarily shown in FIGS. 1, 3 and 4 and same reference numerals designate same or corresponding components throughout the drawings.

Figure 1:
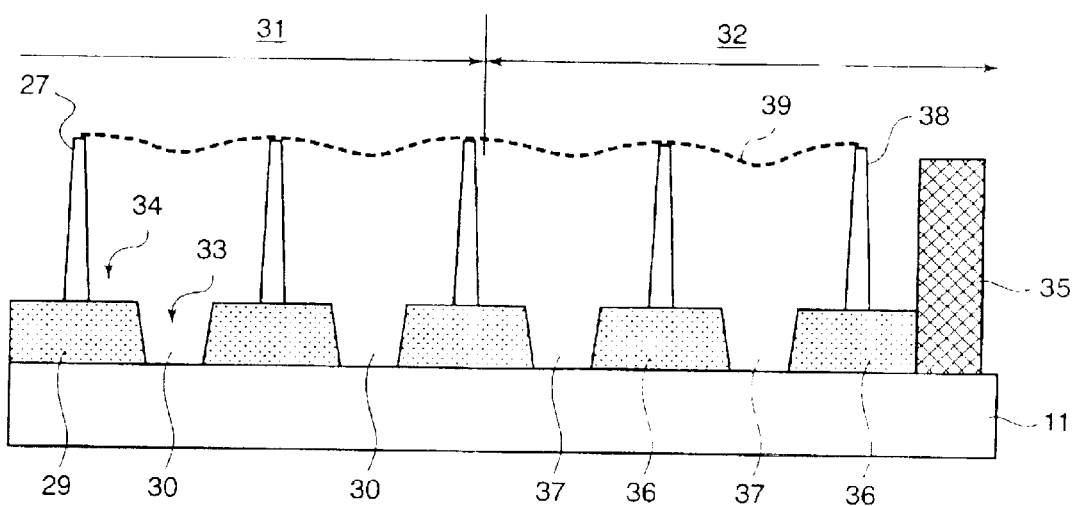
FIG. 1 is a schematically sectional view of a TFT array substrate of an LCD device in accordance with the present invention.
Figure 2:
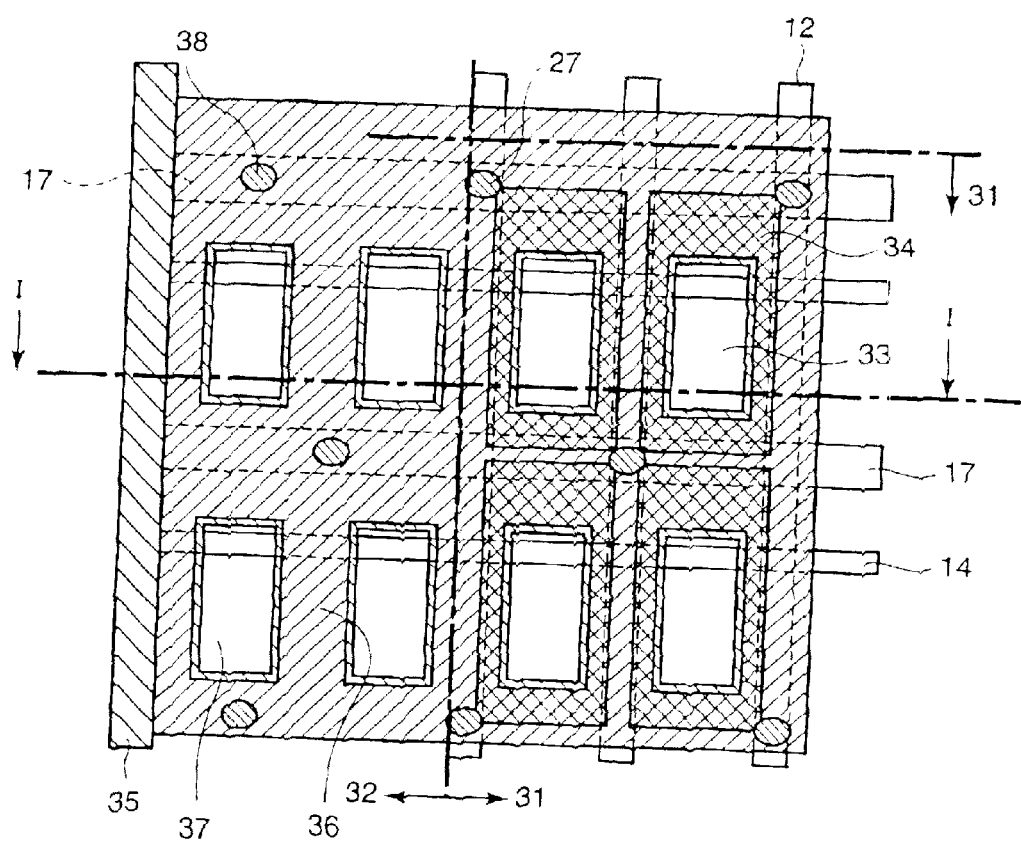
FIG. 2 is a schematic layout in a sectional view of the LCD device shown in FIG. 1.

FIGS. 1 and 2 are a schematically sectional view and a schematic layout of a TFT array substrate of an LCD device in accordance with a first embodiment of the present invention, respectively. The schematically sectional view of FIG. 1 is the one cut along the line I—I of the TFT array substrate shown in FIG. 2. A frame area 32 includes convex and concave portions 36 and 37 equivalent to convex and concave portions 29 and 30 of a display area 31, respectively. The convex and concave portions 36 and 37 are formed by the same process as convex and concave portions 29 and 30. Column-like spacers 27 and 38 are provided on the convex portions 29 and 36, respectively. Since the display area 31 includes the convex and concave portions 29 and 30 and the frame area 32 also includes the convex and concave portions 36 and 37, both display and frame areas 31 and 32 cause the "leveling" phenomenon. A photoresist coating surface, shown by a dotted line in FIG. 1 defined by the column-like spacers 27 and 38, however, have substantially the same convex and concave portions and the column-like spacers 27 and 38 are substantially the same in height. Thus, when the TFT array substrate is assembled with a counter substrate by a sealant 35, a cell gap between them is keep substantially constant, so that the LCD device results in good display quality.

Figure 3:
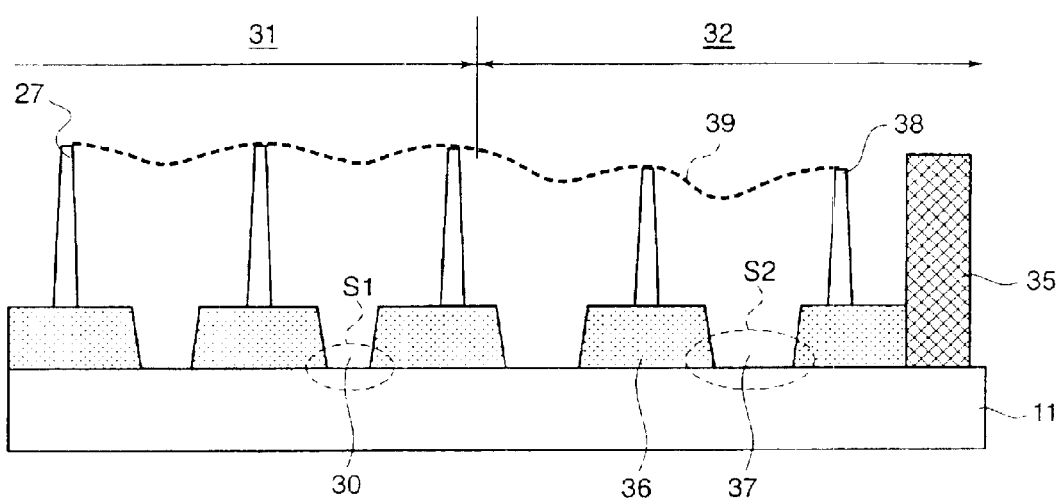
FIG. 3 is a schematically sectional view of a TFT array substrate of an LCD device in accordance with a second embodiment of the present invention.

FIG. 3 is a schematically sectional view a TFT array substrate of an LCD device in accordance with a second embodiment of the present invention. In this embodiment an aperture size S2 of the concave portions 37 in the frame area 32 is configured to be bigger than that of aperture size S1 of the concave portions 30 in the display area 31. All the elements except for that are the same as in FIG. 1.

With the structure of the third embodiment, when the column-like spacers 27 and 38 are formed by coating a photoresist film, the frame area 32 cause its photoresist film thickness a leveling phenomenon greater than that of the display area 31. In other words, as shown by a dotted line 39 of FIG. 3, the photoresist coating surface of the column-like spacers 38 in the frame area 32 descends more rapidly than that of the column-like spacers 27 in the display area 31. The column like spacers 38 made of the photoresist film are lower that the column-like spacers 27.

Usually, when the TFT array and counter substrates are incorporated into the LCD device, the spacers are slightly crushed at their top and the entire panel of the LCD device is nearly uniform in cell gap. Such crushing at the top of the column-like spacers 38 is affected by a sealant 35 covering peripheral portions of the frame area 32. The column-like spacer 38 located closest to the sealant 35 is less crushed as it is closer to the sealant 35. Even if the column-like spacers 27 and 38 are made substantially the same in height, the column-like spacers 38 in the frame area 32 are higher than the column-like spacers 27 after the TFT array and counter substrates have been assembled, so that it causes in the LCD device an uneven cell gap.

Since, however, the concave descent of the photoresist coating film in the frame area 32 is greater than that in the display area 31 in the second embodiment but the column-like spacers 38 are less crushed at their top because of the sealant 35, the cell gap of the LCD device is kept substantially uniform as a whole so that the LCD device can have a good quality display.

Since the column-like spacers 38 are less crushed as they are closer to the sealant 35, the aperture size S2 of the concave portions 37 are made gradually bigger in accordance with the distance from the edge of the display area 31 but the aperture size S2 of the concave portions 37 that are closest to the edge can be equal to that S1 of the display area 31. In this case the column-like spacers 38 that are closest to the end of the display area 31 are made the same in height as the column-like spacers 27 but are gradually lower in height as they are closer to the sealant 35. With this structure, the cell gap is kept more uniform over the entire panel of the LCD device.

Figure 4:
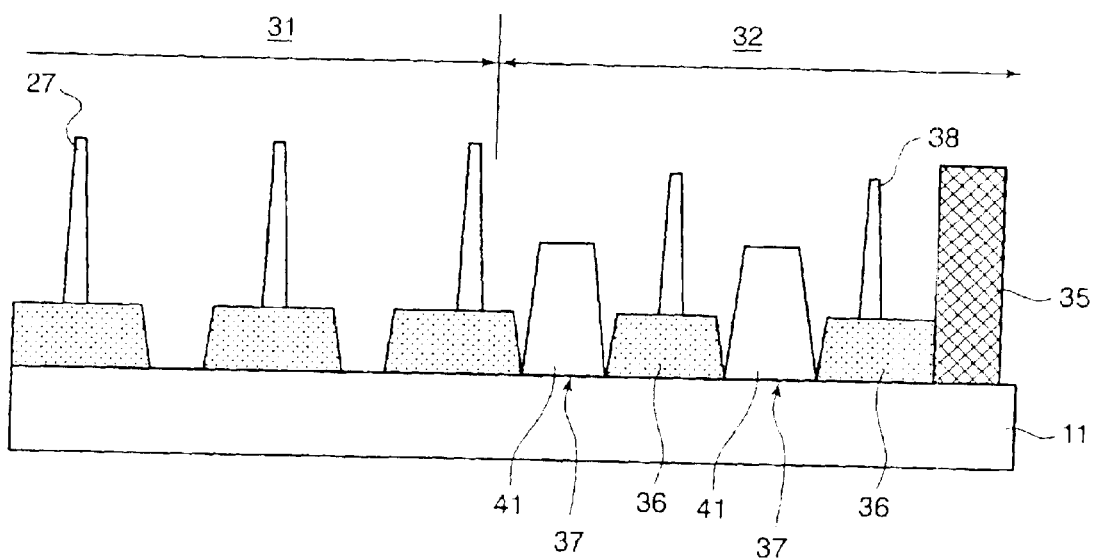
FIG. 4 is a schematically sectional view of a TFT array substrate of an LCD device in accordance with a third embodiment of the present invention.
Figure 5:
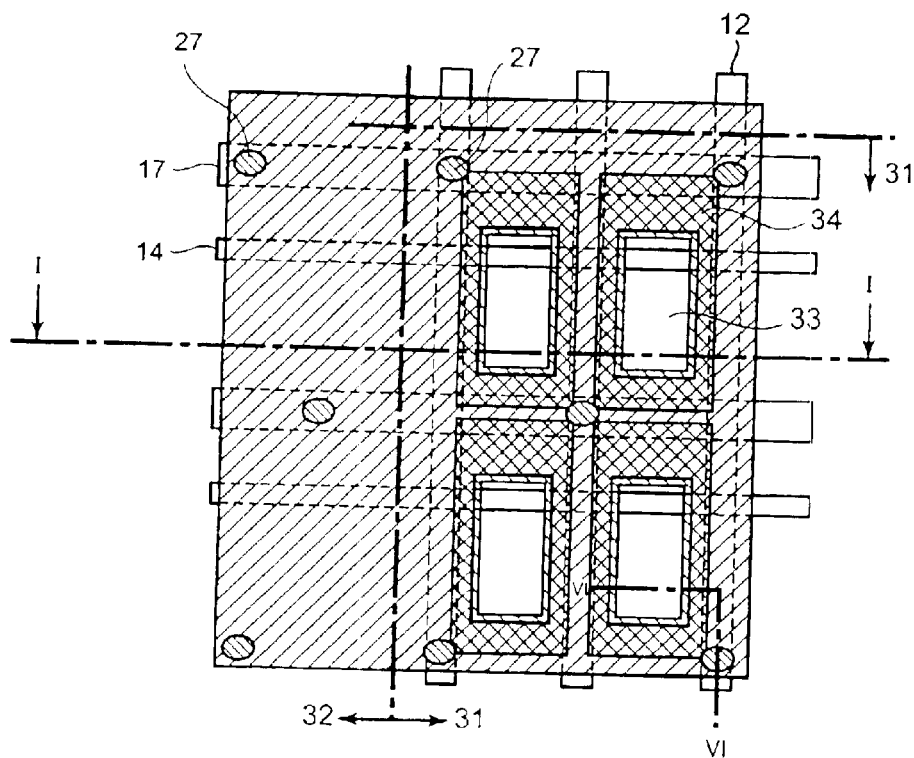
FIG. 5 is a schematic layout in a sectional view of a prior art LCD device.

FIG. 4 shows schematically a sectional view of a TFT array substrate of an LCD device in accordance with a third embodiment of the present invention. The TFT array substrate includes projections 41 provided in the concave portions 37 of the frame area 32 which do not reach the counter substrate, which is not shown, or function as spacers. The projections 41 are formed in the same process as the column-like spacers 27 and 38. The other components and structure of the TFT array substrate are the same as in FIG. 1.

With the structure shown in FIG. 4 the column-like spacers 27 and 38 made of a photoresist film are made substantially the same in height, so that the cell gap can be kept substantially uniform and the LCD device has a good quality display.

In addition, since the projections 41 are disposed in the defined by wires of driver circuits provided in the frame area 32 can be reduced, low power consumption is achieved with the LCD device and operation errors of the driver circuits due to signal wave delays are avoided.

The present invention can substantially prevent uneven cell gaps from being caused by height difference between column-like spacers in display and frame area of an LCD device and can provide an LCD device with a good quality display.

What is claimed is:

1. A liquid crystal display device comprising:
   a first substrate having a display area and a frame area;
   pixel electrodes including reflective and transparent portions formed on said display area of said first substrate;
   said reflective and transparent portions being convex and concave in shape, respectively;
   scanning lines to transmit scanning signals;
   signal lines divided into at least first and second groups to transmit data signals;
   a second substrate provided opposite to said first substrate;
   a counter electrode formed on said second substrate;
   column like spacers to maintain a gap between said first and second substrates;
   a liquid crystal layer held between said first and second substrate; and
   convex and concave portions formed on said frame area.

2. The liquid crystal display device according to claim 1, wherein said convex and concave portions formed on said frame area are substantially the same in shape as said reflective and transparent portions formed on said display area.

3. The liquid crystal display device according to claim 1 or 2, wherein said column like spacers are provided on said convex portions formed on said frame area and said reflective portions formed on said display area.

4. The liquid crystal display device according to claim 3, wherein said column like spacers are made on said first substrate by steps of coating a photoresist film, exposure, development and removal.

5. The liquid crystal display device according to claim 1 or 2, wherein said column like spacers are made on said first substrate by steps of coating a photoresist film, exposure, development and removal.

* * * * *